(12) United States Patent
Kuo et al.

(10) Patent No.: US 11,951,578 B1
(45) Date of Patent: Apr. 9, 2024

(54) CUTTING FLUID DIGITAL MONITORING MANAGEMENT SYSTEM AND METHOD

(71) Applicant: National Kaohsiung University of Science and Technology, Kaohsiung (TW)

(72) Inventors: Chun-Chih Kuo, Kaohsiung (TW); Jyun-Wei Gu, Kaohsiung (TW); Cheng-Yu Yang, Kaohsiung (TW)

(73) Assignee: NATIONAL KAOHSIUNG UNIVERSITY OF SCIENCE AND TECHNOLOGY, Kaohsiung (TW)

( * ) Notice: Subject to any disclaimer, the term of this patent is extended or adjusted under 35 U.S.C. 154(b) by 0 days.

(21) Appl. No.: 18/073,814

(22) Filed: Dec. 2, 2022

(51) Int. Cl.
*B23Q 11/10* (2006.01)

(52) U.S. Cl.
CPC .................. *B23Q 11/10* (2013.01)

(58) Field of Classification Search
CPC ....... B23Q 11/10; B23Q 11/12; B23Q 11/126; B23Q 11/1061
See application file for complete search history.

(56) References Cited

U.S. PATENT DOCUMENTS

| | | | | |
|---|---|---|---|---|
| 5,224,051 A * | 6/1993 | Johnson | ............. | B23Q 11/1061 700/169 |
| 6,555,379 B1 * | 4/2003 | Bremer | ................... | B23Q 11/10 435/31 |
| 10,414,008 B2 * | 9/2019 | Takakuwa | .......... | B23Q 11/1061 |
| 11,167,390 B2 * | 11/2021 | Koshiishi | ............. | B23Q 11/128 |
| 11,199,294 B2 * | 12/2021 | Kenny | .................... | F16N 25/04 |
| 11,555,813 B2 * | 1/2023 | Dierickx | ............ | G01N 33/2888 |
| 2014/0271002 A1 * | 9/2014 | Hoshino | ................ | B23Q 11/10 408/56 |
| 2017/0139432 A1 * | 5/2017 | Endou | ..................... | B23Q 11/10 |
| 2020/0338677 A1 * | 10/2020 | Ozeki | ..................... | B23Q 11/10 |
| 2021/0116150 A1 * | 4/2021 | Uchino | ................ | B23Q 11/126 |
| 2023/0019148 A1 * | 1/2023 | Kubota | ................ | G05B 19/406 |
| 2023/0286096 A1 * | 9/2023 | Izumi | ..................... | B23Q 11/10 74/608 |
| 2023/0311264 A1 * | 10/2023 | Endou | ................ | G05B 23/0235 73/865.8 |

FOREIGN PATENT DOCUMENTS

| | | | | |
|---|---|---|---|---|
| GB | 2547056 A | * | 8/2017 | ............. B23Q 11/10 |
| WO | WO-9014624 A | * | 11/1990 | ......... B23Q 11/1061 |
| WO | WO-2020126457 A1 | * | 6/2020 | ......... G01N 33/2894 |

* cited by examiner

*Primary Examiner* — Michael A Riegelman
(74) *Attorney, Agent, or Firm* — WPAT, P.C

(57) ABSTRACT

A cutting fluid digital monitoring and management system and method are provided, applicable to a computer numerical control (CNC) machining device. The CNC machining device has a cutting fluid tank configured to accommodate a cutting fluid. The cutting fluid digital monitoring and management system includes: a detection tank, configured to extract a cutting fluid from the cutting fluid tank through a motor and an electrically controlled water valve; a concentration sensing module, a pH sensing module, a water hardness sensing module, and a temperature sensing module, respectively configured to obtain a concentration, a pH value, a hardness, and a temperature of the cutting fluid; a processing module, configured to generate a monitoring integration value, compare the monitoring integration value with a standard model, and generate an adjustment signal; and an adjustment module, configured to actively adjust a variable parameter of the cutting fluid according to the adjustment signal.

10 Claims, 4 Drawing Sheets

CUTTING FLUID DIGITAL MONITORING MANAGEMENT SYSTEM AND METHOD

BACKGROUND

Technical Field

The present invention relates to a cutting fluid digital monitoring and management system and method, and in particular, to a cutting fluid digital monitoring and management system and method for automatically extracting a cutting fluid and obtaining relevant data and then automatically adjusting the cutting fluid to a cutting fluid meeting regulations.

Related Art

Generally, main parts forming an appearance, a structure, and interior decoration of an aircraft are basically sheet metal parts. The parts have complex shapes and strict quality control, and have clear requirements and specifications for material properties of formed parts. Therefore, machining is relatively difficult. computer numerical control (CNC) machining is one of main forming processing methods for aircraft sheet metal parts, and has advantages such as high efficiency, high quality of finished products, and high repeatability. During the CNC machining, a cutting tool is mainly used as a main force of shape cutting, and a cutting fluid is used as a focus of workpiece cooling and lubrication. Under long-time mass production operation, a cutting agent is continuously added to a workpiece and a tool surface in order to improve workpiece productivity, reduce tool wear, and ensure workpiece quality.

Therefore, a variety of cutting fluids and cutting fluid application concepts are required nowadays to meet specific requirements for a manufacturing process. For example, water is first used for realizing relatively high heat dissipation efficiency, and it is extremely important to protect the workpiece and a machine according to requirements for an anti-corrosion additive. In an environment with water and the anti-corrosion additive, it is very likely to breed microorganisms. Therefore, a bactericide should be added. In order to improve lubrication, addition of grease leads to a requirement for an emulsifier. This process of developing a water solution cutting agent quickly leads to a complex mixture of cutting agent components such as water, grease, an anti-corrosion additive, a bactericide, an emulsifier, and a defoaming additive. The components have obvious impact on the machining quality, and therefore detection is required every month and even every week. However, poor quality of the cutting fluid often leads to an increase in the defective rate of products, resulting in a waste and consumption of various manpower and material resources in a production line.

SUMMARY

The present invention provides a cutting fluid digital monitoring and management system and method, and is intended to ensure quality of a cutting fluid through automatic detection, automatic addition, and adjustment to a proportion of cutting fluid components, greatly facilitating monitoring of the quality of the cutting fluid.

A cutting fluid digital monitoring and management system of the present invention is applicable to a computer numerical control (CNC) machining device. The CNC machining device has a cutting fluid tank configured to accommodate a cutting fluid. The cutting fluid digital monitoring and management system comprises: a detection tank, configured to extract a cutting fluid from the cutting fluid tank through a motor and an electrically controlled water valve, and discharge the cutting fluid to the cutting fluid tank after detection; a concentration sensing module, having a concentration sensing element configured to measure a concentration, where the pH sensing element is arranged in the detection tank and is configured to measure a concentration of the cutting fluid; a pH value sensing module, having a pH sensing element configured to measure a pH value, where the pH sensing element is arranged in the detection tank and is configured to measure a pH value of the cutting fluid; a water hardness sensing module, having a hardness sensing element configured to measure a hardness, where the hardness sensing element is arranged in the detection tank and is configured to measure a hardness of the cutting fluid; a temperature sensing module, having a temperature sensing element configured to measure a temperature, where the temperature sensing element is arranged in the detection tank and is configured to measure a temperature of the cutting fluid; a processing module, electrically connected to the concentration sensing module, the pH value sensing module, the water hardness sensing module, and the temperature sensing module, and configured to: generate a monitoring integration value according to the concentration, the pH value, the hardness, and the temperature, compare the monitoring integration value with a standard model, and determine whether the monitoring integration value is within a preset range, and if not, generate an adjustment signal; and an adjustment module, configured to actively adjust a variable parameter of the cutting fluid according to the adjustment signal.

In an embodiment of the present invention, the cutting fluid digital monitoring and management system further comprises an external interface configured to receive the monitoring integration value and the adjustment signal.

In an embodiment of the present invention, the external interface comprises but is not limited to a monitoring system, a display, or an intelligent mobile apparatus.

In an embodiment of the present invention, the external interface is connected to the processing module through wireless transmission or wired transmission.

In an embodiment of the present invention, a flow sensing element configured to measure flow is further arranged in the detection tank, and the flow sensing element is arranged in a water main between the cutting fluid tank and the detection tank and is configured to monitor flow of the water main configured to convey the cutting fluid.

In an embodiment of the present invention, the detection tank controls the flow through the motor and the electrically controlled water valve according to the flow and the concentration of the cutting fluid.

In an embodiment of the present invention, the variable parameter is the concentration, the pH value, the hardness, or the temperature of the cutting fluid.

The present invention further provides a cutting fluid digital monitoring and management method, applicable to a CNC machining device. The cutting fluid digital monitoring and management method comprises the following steps: extracting a cutting fluid from a cutting fluid tank to a detection tank through a motor and an electrically controlled water valve; sensing at least one variable parameter of the cutting fluid through a sensing module; generating a monitoring integration value according to the at least one variable parameter and comparing the monitoring integration value with a standard model through a processing module; generating an adjustment signal through the processing module when the monitoring integration value exceeds a preset range; and actively adjusting the variable parameter of the cutting fluid according to the adjustment signal through an adjustment module.

In an embodiment of the present invention, the standard model is generated according to the variable parameter and a decision parameter through neural network training.

In an embodiment of the present invention, the step of actively adjusting the variable parameter of the cutting fluid according to the adjustment signal through the adjustment module further comprises: adjusting the concentration of the cutting fluid by adding water or an original cutting fluid, and adjusting a pH value of the cutting fluid by adding a buffer agent.

Effects of the present invention are as follows. Corresponding parameters of the cutting fluid are monitored in real time by sensing the concentration, the pH value, the hardness, or the temperature of the cutting fluid, and various parameters are adjusted in real time according to the parameter variation, so as to ensure quality of the cutting fluid. In this way, corrosion of a cutting tool and reduction of cutting yield caused by an abnormal state of the cutting fluid can be avoided, and a worker may further track an abnormal situation in a cutting process of a product through the external interface.

DETAILED DESCRIPTION

Figure 1:
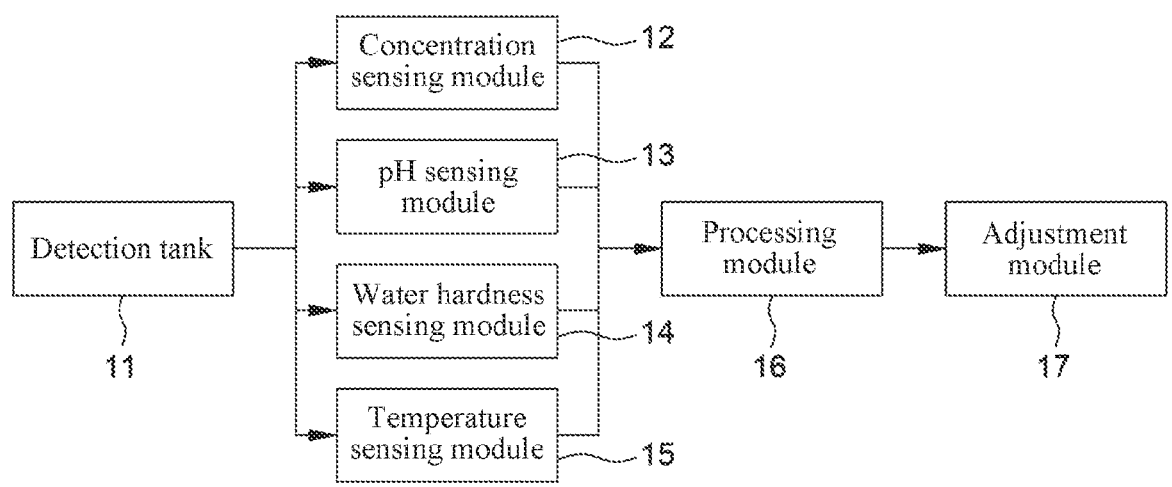
FIG. 1 is a block diagram of a cutting fluid digital monitoring and management system according to the present invention.

In order to make the above features and advantages of the present invention more clearly understood, embodiments are specifically given below in combination with the accompanying drawings. In addition to these detailed descriptions, the present invention may also be widely implemented in other embodiments. Any easy substitution, modification, and equivalent changes of the embodiments are all included in the scope of the present invention, and the scope of the patent application shall prevail. In the description of the specification, in order to make a reader have relatively complete understanding of the present invention, a plurality of specific details is provided. However, it is possible that the present invention may be implemented with some or all of the specific details being omitted. In addition, well-known steps or elements have not been described in detail to avoid unnecessary limitations on the present invention. The same or similar elements in the figures are represented by the same or similar reference numerals. It is particularly noted that the figures are merely for illustration, and do not represent actual sizes or quantities of elements. Some details may not be completely drawn to simplify the drawings. A detailed description is given as follows.

Refer to FIG. 1. FIG. 1 is a block diagram of a cutting fluid digital monitoring and management system according to the present invention. A cutting fluid digital monitoring and management system of the present invention is applicable to a computer numerical control (CNC) machining device. The CNC machining device has a cutting fluid tank configured to accommodate a cutting fluid. The cutting fluid digital monitoring and management system comprises: a detection tank 11, configured to extract a cutting fluid from the cutting fluid tank through a motor and an electrically controlled water valve, and discharge the cutting fluid to the cutting fluid tank after detection; a concentration sensing module 12, having a concentration sensing element configured to measure a concentration, where the pH sensing element is arranged in the detection tank 11 and is configured to measure a concentration of the cutting fluid; a pH value sensing module 13, having a pH sensing element configured to measure a pH value, where the pH sensing element is arranged in the detection tank 11 and is configured to measure a pH value of the cutting fluid; a water hardness sensing module 14, having a hardness sensing element configured to measure a hardness, where the hardness sensing element is arranged in the detection tank 11 and is configured to measure a hardness of the cutting fluid; a temperature sensing module 15, having a temperature sensing element configured to measure a temperature, where the temperature sensing element is arranged in the detection tank 11 and is configured to measure a temperature of the cutting fluid; a processing module 16, electrically connected to the concentration sensing module 12, the pH value sensing module 13, the water hardness sensing module 14, and the temperature sensing module 15, and configured to: generate a monitoring integration value according to the concentration, the pH value, the hardness, and the temperature, compare the monitoring integration value with a standard model, and determine whether the monitoring integration value is within a preset range, and if not, generate an adjustment signal; and an adjustment module 17, configured to actively adjust a variable parameter of the cutting fluid according to the adjustment signal.

In this embodiment, the cutting fluid digital monitoring and management system further comprises an external interface configured to receive the monitoring integration value and the adjustment signal.

The external interface comprises but is not limited to a monitoring system, a display, or an intelligent mobile apparatus.

The external interface is connected to the processing module 16 through wireless transmission or wired transmission.

In this embodiment, a flow sensing element configured to measure flow is further arranged in the detection tank 11, and the flow sensing element is arranged in a water main between the cutting fluid tank and the detection tank 11 and is configured to monitor flow of the water main configured to convey the cutting fluid.

The detection tank 11 controls the flow through the motor and the electrically controlled water valve according to the flow and the concentration of the cutting fluid.

In this embodiment, the cutting fluid digital monitoring and management system further includes a fluid level sensing unit configured to detect a fluid level of the cutting fluid tank.

In this embodiment, the variable parameter is the concentration, the pH value, the hardness, or the temperature of the cutting fluid.

The concentration of the cutting fluid is a concentration percentage value of the original cutting fluid after being mixed with water.

When the concentration of the cutting fluid is too low, the original cutting fluid is added to increase the concentration.

When the concentration of the cutting fluid is too high, water is added to decrease the concentration.

In this embodiment, the pH sensing module has a potential electrode, and the pH value is obtained by using a potential difference change.

A buffer fluid is added to the cutting fluid to neutralize and adjust the pH value of the cutting fluid.

The buffer fluid may be but not limited to an electropolymerization solution.

In this embodiment, the hardness sensing element may be but not limited to a total dissolved solids (TDS) sensing element.

The TDS is a measure of total dissolved solids. The total dissolved solids include inorganic salts such as calcium, magnesium, potassium, and sodium, and a small amount of organic matter dissolving in water.

Figure 2:
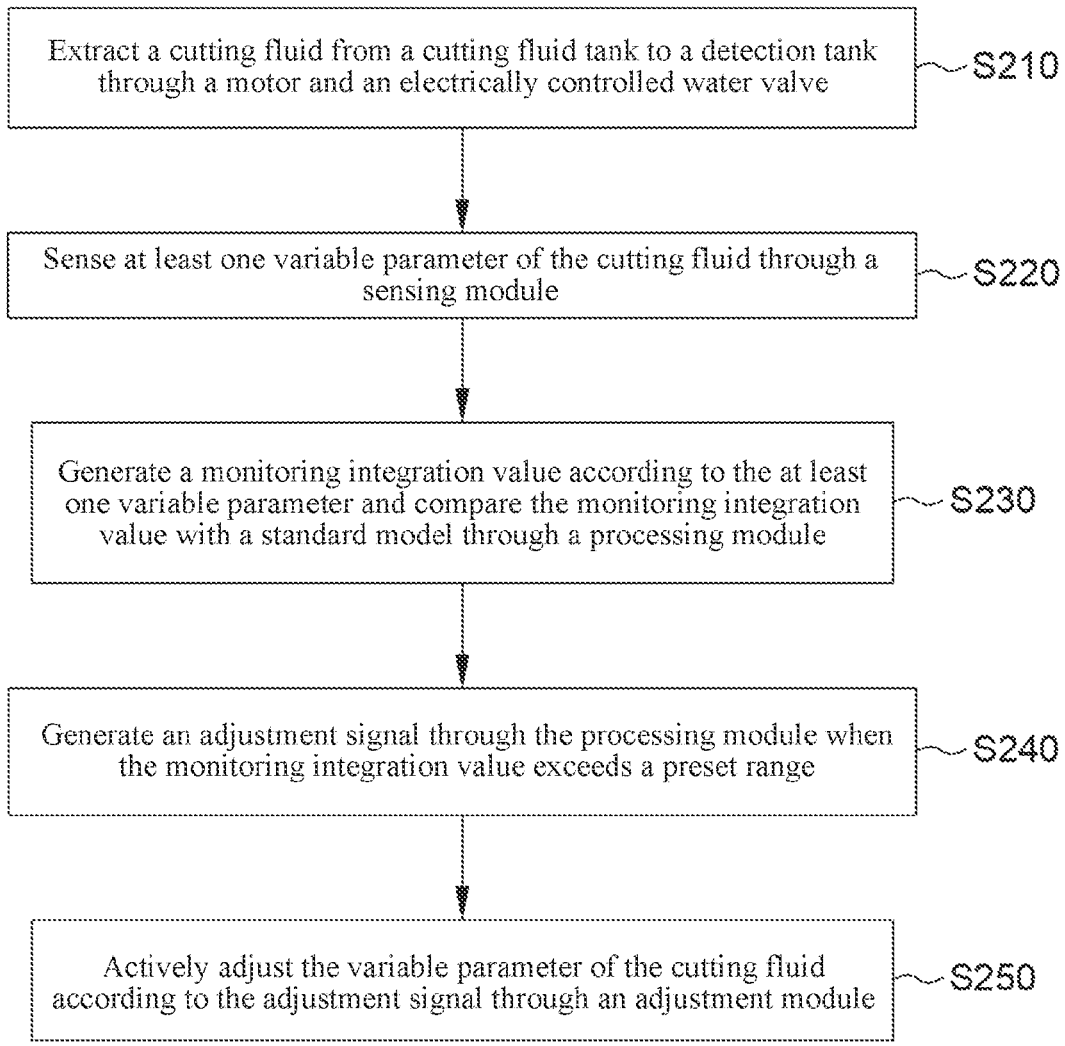
FIG. 2 is a flowchart of steps of a cutting fluid digital monitoring and management method according to the present invention.
Figure 3:
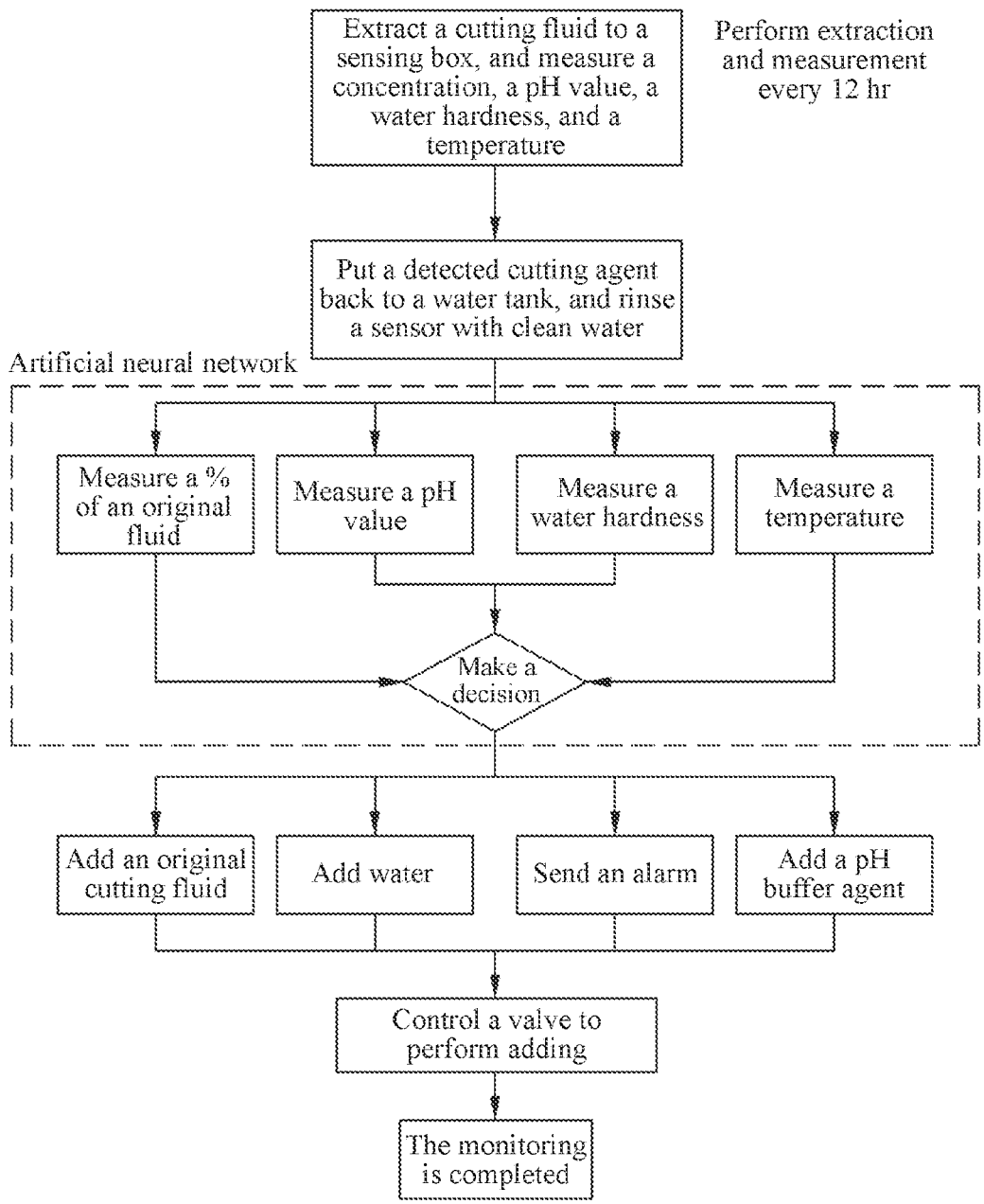
FIG. 3 is a schematic diagram of a decision process of an embodiment of a cutting fluid digital monitoring and management method according to the present invention.

Refer to FIG. 2 and FIG. 3 together. FIG. 2 is a flowchart of steps of a cutting fluid digital monitoring and management method according to the present invention, and FIG. 3 is a schematic diagram of a decision process of an embodiment of a cutting fluid digital monitoring and management method according to the present invention. The cutting fluid digital monitoring and management method in FIG. 2 is applicable to a CNC machining device. The cutting fluid digital monitoring and management method includes the following steps.

Step S210: Extract a cutting fluid from a cutting fluid tank to a detection tank through a motor and an electrically controlled water valve.

Step S220: Sense at least one variable parameter of the cutting fluid through a sensing module.

Step S230: Generate a monitoring integration value according to the at least one variable parameter and compare the monitoring integration value with a standard model through a processing module.

Step S240: Generate an adjustment signal through the processing module when the monitoring integration value exceeds a preset range.

Step S250: Actively adjust the variable parameter of the cutting fluid according to the adjustment signal through an adjustment module.

Upon completion of the detection, the cutting fluid is discharged to the cutting fluid tank through the motor and the electrically controlled water valve.

The sensing module includes a concentration sensing module, a pH sensing module, a water hardness sensing module, and a temperature sensing module.

In this embodiment, a flow sensing element configured to measure flow is further arranged in the detection tank. The flow sensing element is arranged in a water main between the cutting fluid tank and the detection tank and is configured to monitor flow of the water main configured to convey the cutting fluid.

The detection tank controls the flow through the motor and the electrically controlled water valve according to the flow and the concentration of the cutting fluid.

In this embodiment, the cutting fluid digital monitoring and management system further includes a fluid level sensing unit configured to detect a fluid level of the cutting fluid tank.

In this embodiment, the variable parameter is the concentration, the pH value, the hardness, or the temperature of the cutting fluid.

The concentration of the cutting fluid is a concentration percentage value of the original cutting fluid after being mixed with water.

When the concentration of the cutting fluid is too low, the original cutting fluid is added to increase the concentration.

When the concentration of the cutting fluid is too high, water is added to decrease the concentration.

In this embodiment, the pH sensing module has a potential electrode, and the pH value is obtained by using a potential difference change.

A buffer fluid is added to the cutting fluid to neutralize and adjust the pH value of the cutting fluid.

The buffer fluid may be but not limited to an electropolymerization solution.

In this embodiment, the hardness sensing element may be but not limited to a total dissolved solids (TDS) sensing element.

The TDS is a measure of total dissolved solids. The total dissolved solids include inorganic salts such as calcium, magnesium, potassium, and sodium, and a small amount of organic matter dissolving in water.

In this embodiment, the cutting fluid digital monitoring and management method is applicable to a cutting fluid digital monitoring and management system.

In FIG. 3, the standard model is generated according to the cutting fluid digital monitoring and management method through neural network training.

During the neural network training, neurons in a hidden layer are used as variables, a variable mattering most is found through training, and a decision system for practical application is achieved after rules of the variable are found through self-learning by using past data and experience.

In this embodiment, the monitored values such as the concentration, the pH value, the hardness, and the temperature of the cutting fluid are measured, detection values are collected from an actual site, and a decision is made. The standard model is generated by using the actual site data and the decision as a data set and by using weights of the neurons in the hidden layer of the neural network.

Through the neural network training, in order to alleviate the traditional optimization problem, a statistical model such as a Taguchi method is to be used to find an optimal parameter, so as to effectively shorten the time required for determining and monitoring.

Figure 4:
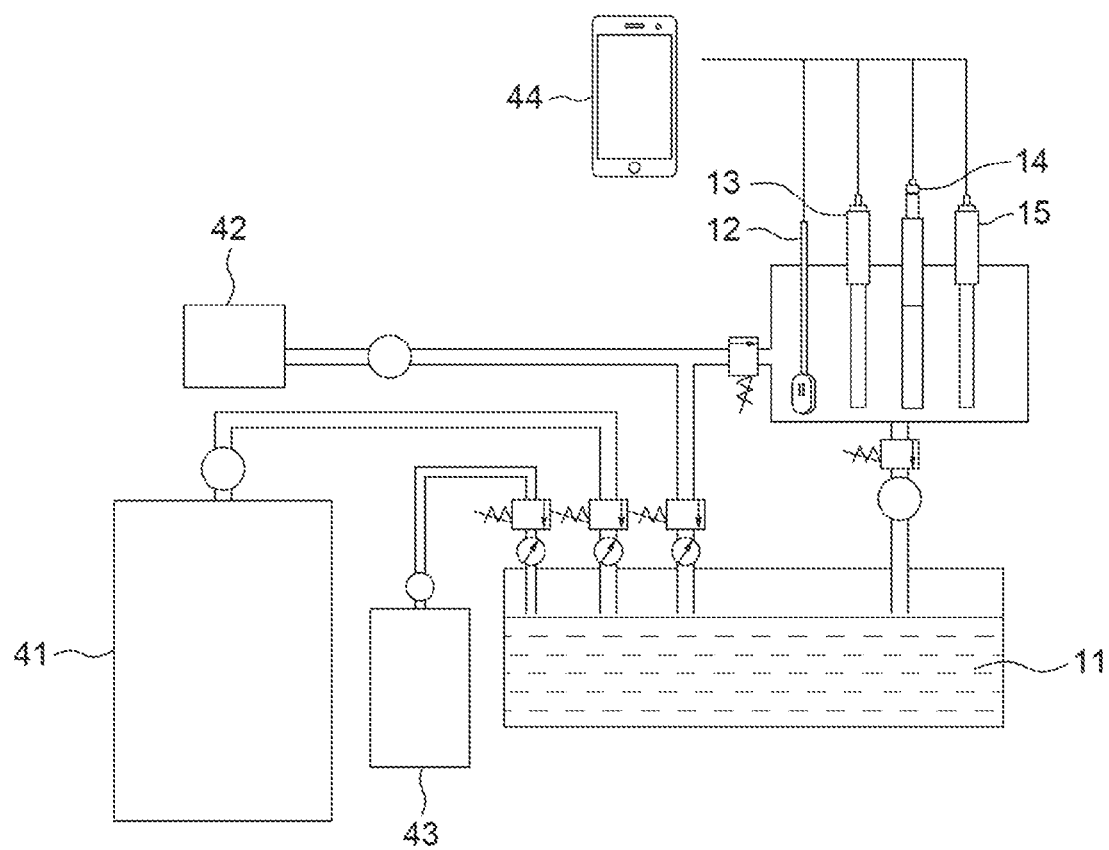
FIG. 4 is a schematic diagram of an apparatus of a cutting fluid digital monitoring and management system according to the present invention.

Refer to FIG. 4. FIG. 4 is a schematic diagram of an apparatus of a cutting fluid digital monitoring and management system according to the present invention. In FIG. 4, the cutting fluid digital monitoring and management system extracts a cutting fluid to a detection tank 11 for detection by using a motor and an electrically controlled water valve. After the detection, the cutting fluid is put back into a cutting fluid tank, and a sensing module is rinsed by using a washing liquid in the detection tank 11.

The detected cutting fluid is put back into the cutting fluid tank through the electrically controlled water valve by using a water main, and a flow meter is further arranged on a pipeline and configured to control flow according to a determined fluid concentration.

Through the system presetting or user setting, the cutting fluid digital monitoring and management system automatically extracts the cutting fluid into the detection tank 11 for detection at a fixed interval.

The sensing module includes a concentration sensing module 12, a pH sensing module 13, a water hardness sensing module 14, and a temperature sensing module 15.

When the concentration of the cutting fluid is too low, the original cutting fluid 41 is added to increase the concentration.

When the concentration of the cutting fluid is too high, water 42 is added to decrease the concentration.

In this embodiment, the pH sensing module 13 has a potential electrode, and the pH value is obtained by using a potential difference change.

A buffer fluid 43 is added to the cutting fluid to neutralize and adjust the pH value of the cutting fluid.

The buffer fluid 43 may be but not limited to an electropolymerization solution.

When the cutting fluid needs to be replaced in case of a serious accident, an alarm is given to indicate that the water and the original cutting fluid 41 should be added.

In this embodiment, the cutting fluid digital monitoring and management system further comprises an external interface 44 configured to receive the monitoring integration value and the adjustment signal.

The external interface 44 comprises but is not limited to a monitoring system, a display, or an intelligent mobile apparatus.

The washing liquid is the water 42.

Based on the above, the effects of the present invention are as follows. Corresponding parameters of the cutting fluid are monitored in real time by sensing the concentration, the pH value, the hardness, or the temperature of the cutting fluid, and various parameters are adjusted in real time according to the parameter variation, so as to ensure quality of the cutting fluid. In this way, corrosion of a cutting tool and reduction of cutting yield caused by an abnormal state of the cutting fluid can be avoided, and a worker may further track an abnormal situation in a cutting process of a product through the external interface.

Although the present invention is disclosed above by using the above embodiments, the embodiments are not intended to limit the present invention. Equivalent substitutions of changes and refinements made by any person skilled in the art without departing from the spirit and scope of the present invention shall still fall within the protect scope of the present invention.

What is claimed is:

1. A cutting fluid digital monitoring and management system, applicable to a computer numerical control (CNC) machining device, wherein the CNC machining device has a cutting fluid tank configured to accommodate a cutting fluid, and the cutting fluid digital monitoring and management system comprises:
   a detection tank, configured to extract the cutting fluid from the cutting fluid tank through a motor and an electrically controlled water valve, and discharge the cutting fluid to the cutting fluid tank after detection;
   a concentration sensing module, having a concentration sensing element configured to measure a concentration, wherein the pH sensing element is arranged in the detection tank and configured to measure a concentration of the cutting fluid;
   a pH value sensing module, having a pH sensing element configured to measure a pH value, wherein the pH sensing element is arranged in the detection tank and configured to measure a pH value of the cutting fluid;
   a water hardness sensing module, having a hardness sensing element configured to measure a hardness, wherein the hardness sensing element is arranged in the detection tank and configured to measure a hardness of the cutting fluid;
   a temperature sensing module, having a temperature sensing element configured to measure a temperature, wherein the temperature sensing element is arranged in the detection tank and configured to measure a temperature of the cutting fluid;
   a processing module, electrically connected to the concentration sensing module, the pH value sensing module, the water hardness sensing module, and the temperature sensing module, and configured to: generate a monitoring integration value according to the concentration, the pH value, the hardness, and the temperature, compare the monitoring integration value with a standard model, determine whether the monitoring integration value is within a preset range, and if not, generate an adjustment signal; and
   an adjustment module, configured to actively adjust a variable parameter of the cutting fluid according to the adjustment signal.

2. The cutting fluid digital monitoring and management system according to claim 1, further comprising an external interface configured to receive the monitoring integration value and the adjustment signal.

3. The cutting fluid digital monitoring and management system according to claim 2, wherein the external interface comprises but is not limited to a monitoring system, a display, or an intelligent mobile apparatus.

4. The cutting fluid digital monitoring and management system according to claim 2, wherein the external interface is connected to the processing module through wireless transmission or wired transmission.

5. The cutting fluid digital monitoring and management system according to claim 1, wherein a flow sensing element configured to measure flow is further arranged in the detection tank, and the flow sensing element is arranged in a water main between the cutting fluid tank and the detection tank and is configured to monitor flow of the water main configured to convey the cutting fluid.

6. The cutting fluid digital monitoring and management system according to 5, wherein the detection tank controls the flow through the motor and the electrically controlled water valve according to the flow and the concentration of the cutting fluid.

7. The cutting fluid digital monitoring and management system according to 1, wherein the variable parameter is the concentration, the pH value, the hardness, or the temperature of the cutting fluid.

8. A cutting fluid digital monitoring and management method, applicable to a computer numerical control (CNC) machining device, wherein the cutting fluid digital monitoring and management method comprises the following steps:
   extracting a cutting fluid from a cutting fluid tank to a detection tank through a motor and an electrically controlled water valve;
   sensing at least one variable parameter of the cutting fluid through a sensing module;
   generating a monitoring integration value according to the at least one variable parameter and comparing the monitoring integration value with a standard model through a processing module;
   generating an adjustment signal through the processing module when the monitoring integration value exceeds a preset range; and actively adjusting the variable parameter of the cutting fluid according to the adjustment signal through an adjustment module.

9. The cutting fluid digital monitoring and management method according to 8, wherein the standard model is generated according to the variable parameter and a decision parameter through neural network training.

10. The cutting fluid digital monitoring and management method according to 8, wherein the step of actively adjusting the variable parameter of the cutting fluid according to the adjustment signal through the adjustment module further comprises: adjusting the concentration of the cutting fluid by adding water or an original cutting fluid, and adjusting a pH value of the cutting fluid by adding a buffer agent.

* * * * *